United States Patent [19]

Troia et al.

[11] Patent Number: 5,196,206
[45] Date of Patent: Mar. 23, 1993

[54] VACUUM HEAT SHIELD

[75] Inventors: Phillip P. Troia, Bath; Joe F. Scantland; Thomas A. Flory, both of Akron, all of Ohio

[73] Assignee: Scantland Industries Inc., Copley, Ohio

[21] Appl. No.: 800,446

[22] Filed: Nov. 26, 1991

[51] Int. Cl.⁵ .............................................. B29C 33/00
[52] U.S. Cl. ................... 425/28.1; 264/326; 264/DIG. 78; 425/210; 425/405.1; 425/DIG. 60
[58] Field of Search ................... 425/28.1, 40, 50, 73, 425/195, 210, 383, 384, 388, 395, 405.1, 407, 408, 420, 546, DIG. 60; 264/101, 326, DIG. 78

[56] References Cited

U.S. PATENT DOCUMENTS

| 3,640,653 | 2/1972 | Laenen et al. | 425/38 |
| 4,185,952 | 1/1980 | Hewitt | 425/405.1 |
| 4,204,822 | 5/1980 | Hewitt | 425/DIG. 60 |
| 4,595,553 | 6/1986 | Blayne et al. | 425/405.1 |
| 4,867,924 | 9/1989 | Schilkey et al. | 425/405.1 |
| 4,957,676 | 9/1990 | Greenwood | 425/405.1 |

FOREIGN PATENT DOCUMENTS

| 62-193814 | 8/1987 | Japan | 425/DIG. 60 |
| 63-149121 | 6/1988 | Japan | 425/DIG. 60 |

*Primary Examiner*—Jay H. Woo
*Assistant Examiner*—James P. Mackey
*Attorney, Agent, or Firm*—Oldham, Oldham & Wilson Co.

[57] ABSTRACT

A tire mold having relatively reciprocable first and second mold halves is provided with a heat shield which includes first and second relatively reciprocable shield members. One of these shield members is fixedly secured to one of the mold halves; the other shield member is fixedly secured to the other mold half. The shield members are spaced from the mold halves so that they enclose a space which surrounds the mold halves. A vacuum tight seal between the shield members is provided. A nipple which is adapted to be connected to a source of vacuum extends through one of the shield members so that the space enclosed by the shield members can be placed under vacuum, thereby inhibiting heat transfer to the atmosphere surrounding the apparatus. Heat transfer is further inhibited by the thin reflective chrome plate layer on the inside wall surfaces of both heat shield members. Preferably the mold halves are arranged one above the other and each is secured to a platen. One of the mold halves and its associated platen are held in fixed position while the other mold half and its associated platen reciprocate vertically. The shield members are preferably vertical hollow cylinders, one being of slightly larger diameter than the other to afford a small clearance therebetween. A resilient sealing ring (or two such rings) in a groove in one of the shield members engages a cylindrical wall surface of the other shield member to provide a vacuum tight seal.

7 Claims, 3 Drawing Sheets

VACUUM HEAT SHIELD

TECHNICAL FIELD

This invention relates to molds and more particularly to tire molds. In particular, this invention relates to an apparatus comprising a mold provided with a heat shield having a vacuum tight seal so that hot air in the space immediately surrounding the mold does not flow outwardly into the atmosphere.

BACKGROUND ART

Molding of a tire requires an elevated temperature as is well known. Because of this elevated temperature and the large size of a tire and the required tire mold, considerable heat is given off. In the absence of any shielding, this heat would be dissipated in the surrounding atmosphere, i.e., the building in which the tire mold or molds are located. This heat loss is costly.

Heat transfer from a tire mold takes place according to three widely recognized methods, i.e., radiation, convection and conduction. Radiation from a hot tire and a hot tire mold or press to the surroundings accounts for part of the heat transfer. Heat transfer may also take place by convection, i.e, by hot air currents which flow outwards from the vicinity of a hot tire and the tire mold to the surrounding atmosphere. Finally, some heat transfer by conduction will take place. As is well known, metals are good conductors of heat while air is a poor conductor so that heat transfer by conduction takes place mainly from the tire to the tire mold and within the tire mold. From the tire mold outward into the atmosphere, radiation and convection are more important.

It is customary to provide a tire press with an insulated heat shield in order to reduce the amount of heat transferred from the tire mold to the surroundings. Nevertheless, some heat transfer by each of the three above methods will take place.

DISCLOSURE OF THE INVENTION

According to this invention, a tire mold is provided with a heat shield having a vacuum tight seal so that no air flow from the space immediately surrounding the tire mold and inside the shield to the atmosphere outside the heat shield, or vice versa, will take place. Preferably, the space surrounding the tire mold and inside the heat shield is under vacuum.

More specifically, this invention provides an apparatus comprising a mold and a heat shield therefor, said apparatus comprising:

(a) first and second mold halves which are reciprocable relative to one another between an open position and a closed position and when in said closed position are in mating engagement along a parting line and enclose a mold cavity;

(b) a first shield member affixed to said first mold half and surrounding said first mold half in spaced relationship;

(c) a second shield member affixed to said second mold half and surrounding said second mold half in spaced relationship;

said first and second shield members being relatively reciprocable with respect to each other, said first and second shield members together on closing a space surrounding said mold halves; and (d) sealing means forming a vacuum tight seal between said first and second shield members, whereby air flow between said space surrounding said mold halves and the atmosphere outside said shield members is prevented and heat transferred to said atmosphere is reduced.

DESCRIPTION OF THE PREFERRED EMBODIMENT

This invention will now be described in detail with respect to the best mode and preferred embodiment thereof.

Figure 1:
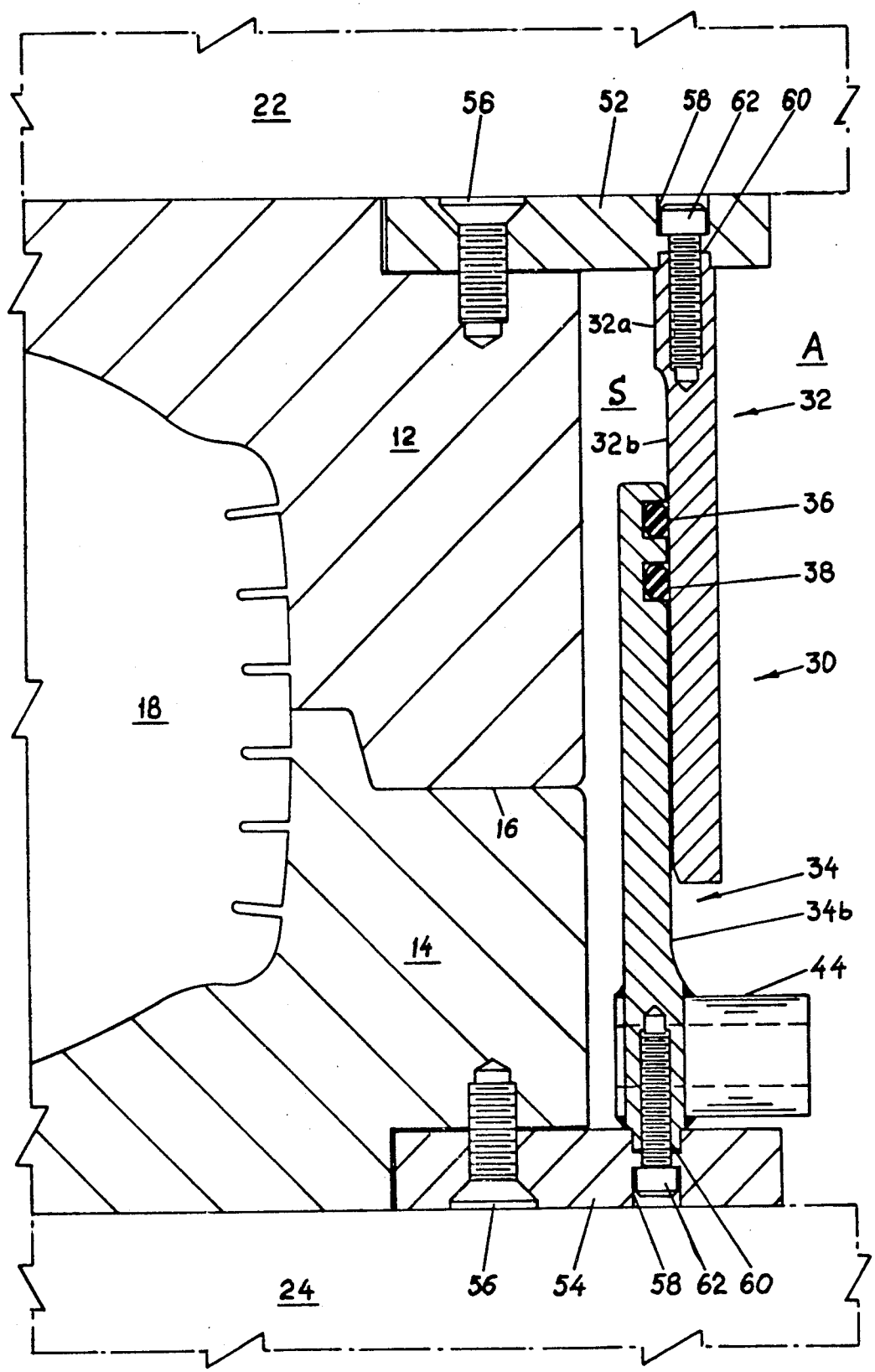
FIG. 1 is vertical sectional view of a tire mold and heat shield therefor in accordance with this invention.

Referring to FIG. 1, 10 is an apparatus according to this invention and comprises a first or upper mold half 12 and a second or lower mold half 14. These mold halves are mating and are reciprocable relative to one another between an open position and a closed position. Normally one of the mold halves (say the lower mold half 14) is held in fixed position while the other mold half (say the upper mold half 12) is vertically reciprocable toward and away form the fixed mold half. When the mold is in closed position, as shown in FIG. 1, the mold halves 12 and 14 are in mating engagement along a parting line 16 and enclose a mold cavity 18. The mold cavity illustrated is a tire mold cavity. The mold halves 12 and 14 as seen in plan view may be of any desired shape but are preferably circular as shown and described herein.

Upper and lower mold halves 12 and 14, respectively, may be secured to upper and lower platens 22 and 24, respectively, by conventional means.

The apparatus of this invention further comprises a heat shield 30 which completely surrounds the mold halves 12 and 14 in spaced relationship, providing an enclosed annular space "S" between the mold halves and the shield. The heat shied 30 comprises a first (or upper) heat shield member 32 which is fixedly secured to the first mold half 12 and which surrounds that mold half in spaced relationship, and a second (or lower) shield member 34 which is fixedly secured to the second mold half 14 and which surrounds the second mold half in spaced relationship. The two shield members 32 and 34 are relatively reciprocable with respect to each other, just as the mold halves 12 and 14 are relatively reciprocable. The shield member which is secured to the fixed mold half (say the lower shield member 34) will remain in fixed position, while the other shield member (say the upper shield member 32) which is affixed to the reciprocable mold half will reciprocate with that mold half. The two shield members 32 and 34 overlap and together enclose annular space "S" surrounding the mold halves when the mold is in closed position.

Each of the shield members 32 and 34 is annular and essentially cylindrical in shape, i.e., the shape of each half is approximately that of a right circular cylinder.

Thus, each of the shield member (or halves) 32 and 34 has an inside wall surface and an outside wall surface, and an inside diameter and an outside diameter. One of the shield members (shown here as the upper shield member 32) is of slightly larger diameter than the other. The inside diameter of the upper shield half 32 is just slightly larger than the outside diameter of the lower shield half 34, so that there will be a small clearance between the overlapping portions of the two shield halves. The clearance in a preferred embodiment is from about 4 mils to about 8 mils (0.004 to 0.008 inch). This clearance can be varied, but must be large enough so that the shield members 32 and 34 do not rub or clash as the mold is opened and closed and small enough for effective sealing (to be described hereinafter). The inside diameter of the lower shield member 34 needs to be larger by some amount than the diameter of the mold halves 12 and 14 to provide an effective vacuum gap.

The upper shield half 32 is fixedly secured along its upper edge to the upper mold half 12 and the upper platen 22 of the tire press by means to be described hereinafter in detail, and extends axially downwardly therefrom. Similarly, the lower shield member 34 is fixedly secured along its lower edge to the lower mold half 14 and the lower platen 24 of the tire press, and extends axially upwardly therefrom. The axial lengths of the upper and lower shield members 32 and 34 respectively are such that they will overlap, when the mold is closed as shown in FIG. 1. The upper edge of upper shield half 32 and the lower edge of lower shield half 34 (in each case the edge at which the shield half is secured to a mold half) may be designated as the first edge, and conversely the other edge (the lower edge of upper shield half 32 and the upper edge of lower shield half 34) may be designed as the second edge. In order to obtain with precision the small clearance required (and specified above) between the overlapping portions of the upper and lower shield members 32 and 34, respectively, metal is machined from the inside surface of the upper shield member 32 and the outside surface of the lower shield member 34. This provides in upper shield member 32 a base portion (or upper portion, or first portion) 32a which is slightly thicker than the remainder (or second portion) 32b (which is the machined portion). Similarly, lower shield member 34 has a base portion (or lower portion, or first portion) 34a which is thicker than the remainder (or second portion) 34b.

Sealing rings (e.g., O-rings), comprising a primary (or upper) seal 36 and secondary (or lower) seal 38, extend around the circumference of lower shield member 34 and provide a vacuum tight seal between the two shield members. Seals 36 and 38 are received in upper groove 40 and lower groove 42, respectively, both formed on the outside wall of lower shield member 34. These seals sealingly engage the inside wall surface of the upper shield member 32. This provides a vacuum tight seal between the interior spaces enclosed by shield 30 and the exterior space or atmosphere "A" which lies outside shield 30.

Figure 5:
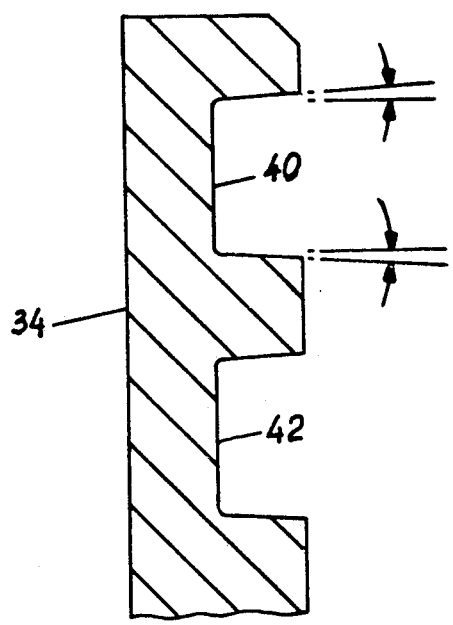
FIG. 5 is a fragmentary vertical sectional view on an enlarged scale of the upper portion of the lower mold section showing the recesses for sealing rings therein.

The side wall surfaces of grooves 40 and 42 may be disposed at a slight angle to the horizontal, as shown in FIG. 5, so that these grooves are slightly wider at the mouth (where the sidewall of the groove intersects the outside wall surface of shield member 34) than at the base (or deepest portion) of the groove, as is consistent with good seal groove design. This is shown in FIG. 5.

One of the shield members, e.g., lower shield member 34 as shown in FIG. 1, is provided with a nipple 44 extending through the shield member. This nipple may be connected to a source of vacuum (not shown) so that the interior space between the mold halves 12 and 14 and the shield 30 may be placed under vacuum. There may be two such nipples 44, spaced 180° apart, if desired.

The inside wall surfaces of the upper shield member 32 and the lower shield member 34 are preferably chrome plated. The thin chromium layer aids in reflecting radiated heat from the hot surfaces of the mold halves 12 and 14 back to the tread of the tire being molded in mold cavity 18. The chrome plating achieves a twofold benefit, first, in improving heat transfer to the tire tread (which typically is at a lower temperature than the temperature of the mold halves 12 and 14 and of the sidewall portions of the tire) and also reduces the amount of radiation from the tire mold to the atmosphere.

Figure 2:
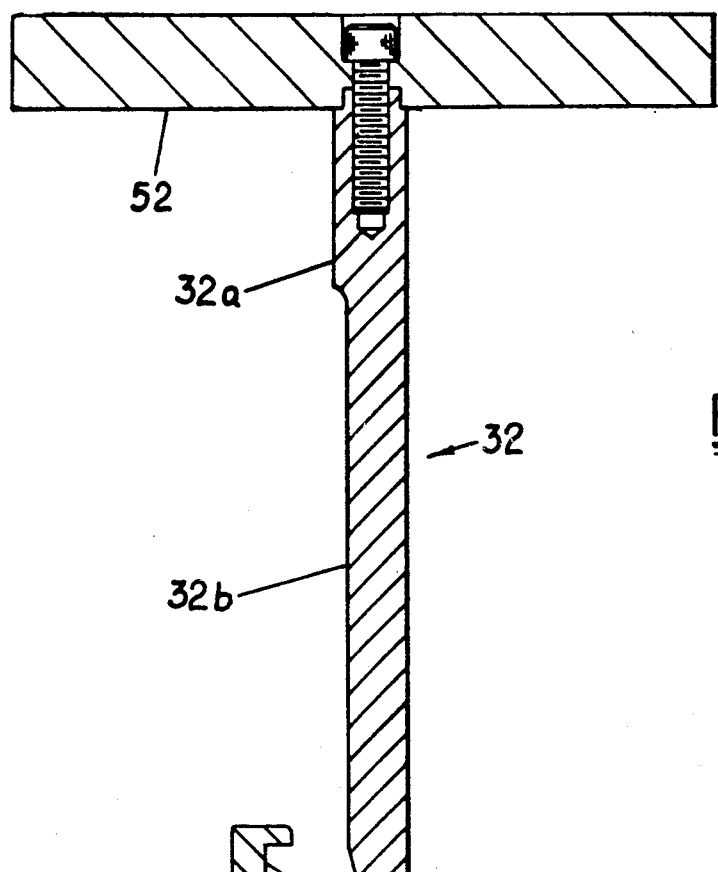
FIGS. 2 and 3 are vertical sectional views of an upper shield member and a lower shield member, respectively, and the respective mold rings to which they are affixed.
Figure 3:
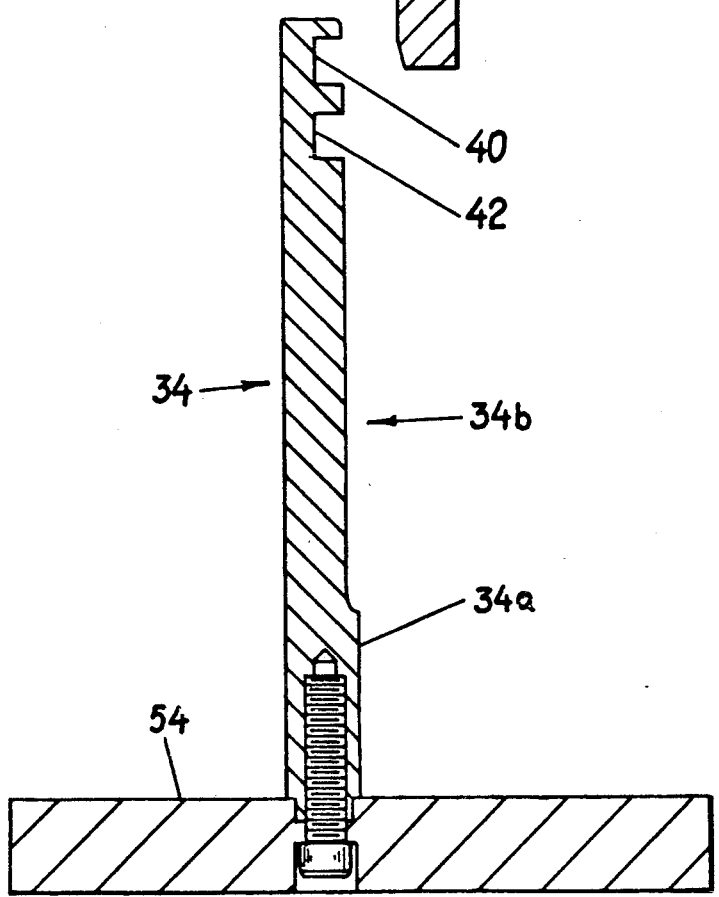
Figure 4:
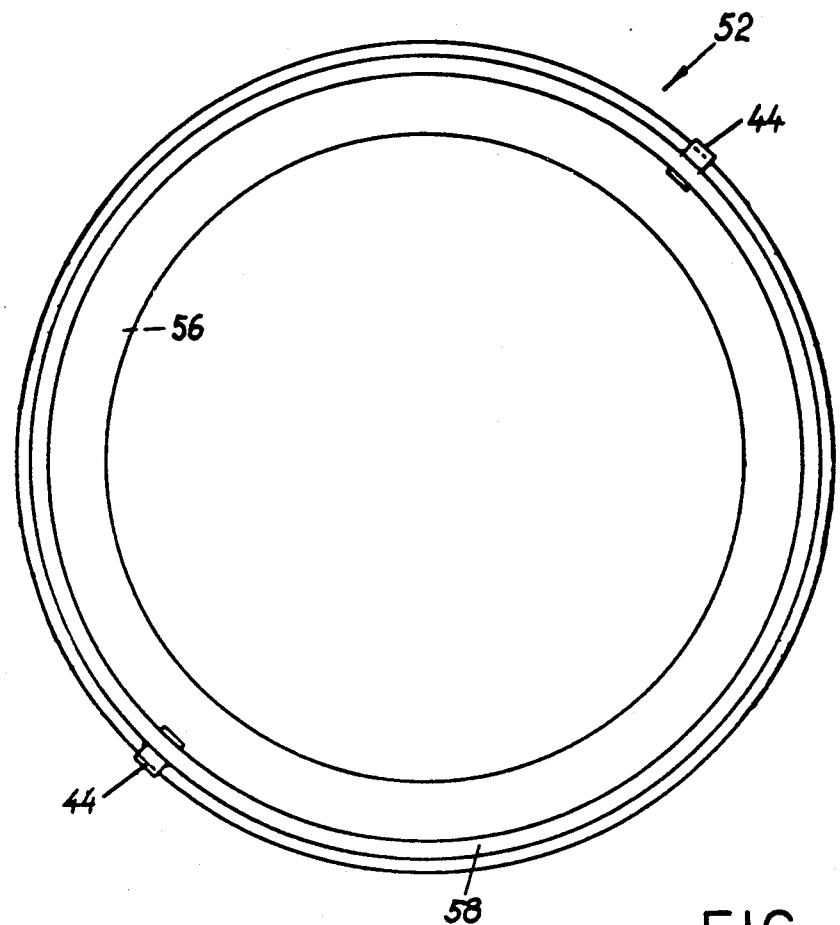
FIG. 4 is a plan view of an upper mold ring in accordance with this invention.

The upper and lower shield members 32 and 34 are fixedly secured to the respective mold halves 12 and 14 by means of top mold ring 52 and bottom mold ring 54, respectively. Top mold ring 52 is shown in FIGS. 2 and 4. Bottom mold ring is shown in FIG. 3. The structures of mold rings 52 and 54 are similar.

The mold halves 12 and 14 and the mold rings 52 and 54 are preferably circular in shape. Top mold ring 52 is attached to the upper portion of mold half 12 so that the top or outside surface of the mold ring 52 is flush with the top or outside surface of the mold half 12. Similarly, bottom mold ring 54 is attached to the lower portion of mold half 14 so that the respective bottom or outside surfaces of the mold half 14 and the mold ring 54 are flush. The outside corners of mold halves 12 and 14 are cut away to receive the respective mold rings 52 and 54 so that the outside surfaces of both the mold halves and the mold rings will be flush.

Each mold ring includes a plurality of bolts 56 arranged in a circle for attaching the mold ring to the adjacent mold half 12 or 14. Each also includes a pair of recesses or grooves 58 and 60 in back to back relationship and having the same diameter, one (outside groove 58) extending from the outside surface of the mold ring, the other (60) extending from the inside surface of the mold ring. The inside grooves 60 receive the respective adjacent edges of the respective shield members 32 and 34, forming dowel joints therewith. Bolts 62 fasten the respective shield members 32 and 34 to the respective mold rings 52 and 54 in fixed relationship. The heads of bolts 62 are received in the outside groove 58.

The base portions 32a and 34a of shield members 32 and 34, respectively, have holes which receive bolts 62. The base portions 32a and 34a are each slightly thicker than the remainder of the shield member as noted earlier; this compensates for any weakening caused by the bolt holes.

The mold rings 52 and 54 may be fixedly attached to the adjacent platens 22 and 24, respectively, by means not shown.

It is important for the respective mold halves 12 and 14 and the platens 22 and 24 be very precisely aligned. The small clearance between the overlapping portions of shield members 32 and 34 requires this. A tire curing press which achieves the precise alignment required is shown and described in U.S. Pat. No. 4,921,412.

The mold rings 52, 54 and the shield 30 herein may be affixed to the mold halves of a tire press at the time of manufacture, or the tire curing press may be retrofitted later.

Dimensions are not critical. Representation dimensions of a heat shield 30 for a tire mold 32 inches in diameter, may be as follows: inside diameter of lower shield member 34, 32¾ inches; thicknesses of both shield members 32 and 34, 1¼ inches at the base (32a and 34a); 1 inch elsewhere. These dimensions are merely representative and can be varied.

The structure of the mold halves 12, 14 and the platens 22, 24, as well as the structure of other elements of a tire curing press, may be conventional.

In operation, a tire curing press as shown in FIG. 1 is opened and a green tire is inserted into the mold cavity 18 in a conventional manner. Then the mold is closed, assuming the position shown in FIG. 1, and heated to vulcanization temperature by conventional means, e.g., by steam coils (which may be located in the platens 22, 24). The interior space "S" surrounding the mold halves 12, 14 and enclosed by shield 30 (i.e, the space between the shield members 32, 34 and the mold halves 12, 14) is placed under vacuum by connecting nipple 44 to a source of vacuum (not shown). Heating and placing under vacuum may be carried out either simultaneously or sequentially in either order.

Placing the interior space of the apparatus of this invention under vacuum results in reducing heat transfer to the surrounding atmosphere since a vacuum is an extremely poor conductor of heat, as is well known. It is not necessary to place the interior space of apparatus under high vacuum; however, to advantage the higher the vacuum, the less the heat transfer from the mold to the surrounding atmosphere.

It is possible to use a mold having no holes extending from the mold cavity to the outside circumference of the mold, when the mold is equipped with the heat shield 30 herein and operated under vacuum. Use of the mold without such holes will result in a tire free of "whiskers". Such whiskers are formed as a matter of general practice in molding techniques currently in use and must be removed mechanically before the tire is sold.

Certain details have been omitted herein. For example, it is desirable to insulate the mold rings 52, 54 from the adjacent mold halves 12, 14. This can be done by providing a thin layer of insulation between the abutting horizontal surfaces of the mold halves and the mold rings, and providing a small air gap between the adjacent vertical cylindrical surfaces of the mold halves and the mold rings. Also, gaskets may be placed in the joints between shield members 32, 34 and the respective mold rings 52, 54 (i.e., between the edges of the shield members and the flat surfaces of the grooves 60) to assure a vacuum tight seal. Also, other details, such as the structure of the tire curing press other than the mold halves 12, 14, and the platens 22, 24, have been omitted, since the tire curing press may be as is known in the art.

While this invention has been described with reference to the best mode and preferred embodiments thereof, it shall be understood that the description is by way of illustration and not limitation.

What is claimed is:

1. An apparatus comprising:
   (a) first and second mating mold halves which are reciprocable relative to one another between an open position and a closed position and which when in said closed position are in mating engagement along a parting line and enclose a mold cavity;
   (b) a first shield member fixedly secured to said first mold half and surrounding said first mold half in spaced relationship;
   (c) a second shield member fixedly secured to said second mold half and surrounding said second mold half in spaced relationship;
   said first and second shield members being relatively reciprocable with respect to each other,
   said first and second shield members together enclosing a space surrounding said mold halves; and
   (d) sealing means forming a vacuum tight seal between said first and second shield members, whereby air flow between said space surrounding said mold halves and the atmosphere outside said shield members is prevented and heat transfer to said atmosphere is reduced.

2. Apparatus according to claim 1, further including an annular nipple extending through one of said shield members and being adapted to be connected to a source of vacuum.

3. Apparatus according to claim 1 wherein said first and second mold halves are upper and lower mold halves, respectively, and said first and second shield members are upper and lower shield members, respectively.

4. Apparatus according to claim 3 wherein said upper and lower shield members are annular metallic members of circular cross sectional shape, said upper shield member having an upper end which is affixed to the upper mold half, said lower shield member having a lower end which is affixed to the lower mold half, and wherein the upper shield member and the lower shield member have overlapping portions which are spaced apart with a small clearance therebetween.

5. Apparatus according to claim 4 wherein said sealing means comprises a resilient sealing ring supported by one of said shield members and extending around the circumference thereof, said sealing ring engaging the other shield member in sealing relationship.

6. Apparatus according to claim 1 wherein one of said shield members has a cylindrical surface having a groove therein which extends around the circumference of said one shield member, and wherein said sealing means includes a resilient sealing ring in said groove, said sealing ring engaging the other shield member in sealing relationship.

7. Apparatus according to claim 1 further including first and second mold rings attached to said first and second mold halves, respectively, and extending around the perimeters thereof, said first and second shield members being attached to said first and second mold rings, respectively.

* * * * *